3,325,441
STABILIZATION OF POLYPROPYLENE
George Joseph McNally, Montclair, N.J., and Louis Peter Cipriani, Easton, Pa., assignors to American Cyanamid Company, Stamford, Conn., a corporation of Maine
No Drawing. Filed Apr. 7, 1964, Ser. No. 358,081
4 Claims. (Cl. 260—41)

This invention relates to a method for stabilizing polypropylene and to the stable compositions thus prepared.

Compositions of polypropylene have found wide application. However, a serious drawback to many uses is their instability upon exposure to heat and light; without stabilization by one means or another, polypropylene is quickly deteriorated. This vulnerability has hindered use of polypropylene for certain applications. If stability could be improved, polypropylene would lend itself to even wider applications.

Various antioxidant materials have been used to stabilize polypropylene with some degree of success. Until the present time, the need for an economical, but effective means of stabilizing has not been satisfactorily fulfilled.

The present invention is based on the discovery that compositions which are extremely stable to the effects of heat and light result when the polypropylene is blended with $TiO_2$ pigment and a hindered phenol type of antioxidant. Thus, although each of these additives alone provides only a small degree of protection against degradation by heat and light, the combination of additives in the polypropylene results in enhanced protection even over extended periods of exposure.

It is most surprising and quite unexpected that such effective stabilization results using the combination of the invention, since, in other plastics (including polyethylene), stabilization by an antioxidant is hardly improved, if at all, by addition of $TiO_2$.

Thus, in acrylonitrile-butadiene styrene, the use of a combination of $TiO_2$ and an antioxidant shows little increased effect. Also, in polystyrene, for example, the presence of the $TiO_2$-antioxidant combination does not noticeably increase light stability of the polymer. This lack of improvement is also found in polyvinylchloride where the combination of $TiO_2$ with antioxidant is no more effective than the latter by itself.

For use in the compositions of this invention, $TiO_2$ of either the rutile or anatase type may be used. Preferably, the rutile type is used. The particle size range of the pigment is not particularly critical, and commercially available $TiO_2$ having a range of 0.05 to 0.4 micron is useful. The concentration of the $TiO_2$ in the composition may range from 0.5 to 5 percent and preferably is in the area of about 2 percent.

The antioxidants which are suitable in the compositions of this invention are of the hindered phenol type and include those having one to three phenolic groups. By "hindered phenol" is meant a phenol to which in either one or both of the ortho positions to the hydroxyl group is attached at least one bulky group, for example t-butyl. Specific examples of the antioxidants are the following:

2,6-di-tert-butyl-4-methylphenol
4,4'-thiobis(6-tert-butyl-m-cresol)
4,4'-butylidenebis(6-tert-butyl-m-cresol)
2,6-bis(2-hydroxy-3-t-butyl-5-methylbenzyl)-p-cresol
2,2'-methylenebis(4-ethyl-6-tert-butylphenol)
2,2'-methylenebis(4-methyl-6-tert-butylphenol)

The concentration of the antioxidant in the polypropylene compositions may range from 0.02 percent to 1.0 percent and, preferably, from about 0.1 to 0.5 percent. A practical concentration and one which is preferred is about 0.2 percent.

The invention is further illustrated by the examples which follow.

EXAMPLE 1

*Evaluation in polypropylene*

Polypropylene compositions containing the $TiO_2$ antioxidant combinations are prepared and exposed to ultraviolet light. The time of exposure before development of brittleness is observed. The procedure is described in more detail as follows:

Fifty grams of unstabilized polypropylene powder are placed in a screw-top jar along with the additive to be tested and tumbled for two hours. The blend is then placed on a 6" x 13" mill whose rolls are heated to 360° F. and 320° F. and it is passed through the nip of the rolls, stripped, and fed end-wise into the nip to insure maximum mixing. This operation is repeated ten times. From the resulting sheet, a 15 to 20 mil sheet is compression-molded at about 450° F. using about twenty-five tons pressure. From this molded sheet, specimens are cut out for the test.

The specimens are exposed in the Fade-Ometer and outdoors in sunshine. The length of exposure before brittle point is reached, is noted. The results of these tests are presented in the following Table I. For convenience, the antioxidants are referred to by letter according to the following code:

Antioxidants:
- A—2,2'-methylenebis(4-ethyl-6-tert-butylphenol)
- B—2,2'-methylenebis(4-methyl-6-tert-butylphenol)
- C—2,6-bis(2-hydroxy-3-t-butyl-5-methylbenzyl)-p-cresol
- D—4,4'-thiobis(6-tert-butyl-m-cresol)
- E—4,4'-butylidenebis(6-tert-butyl-m-cresol)
- F—2,6-di-tert-butyl-4-methylphenol

TABLE I

| Additive | Percent | Time to Brittle Points | |
|---|---|---|---|
| | | Hours in Fade-Ometer | Months in Arizona Sunshine |
| None | | <100 | <2 |
| $TiO_2$ | 2 | 250 | <2 |
| Antioxidant A | 0.2 | 150 | <3 |
| Antioxidant B | 0.2 | 150 | <2 |
| Antioxidant C | 0.2 | 150 | <2 |
| Antioxidant D | 0.2 | 150 | <2 |
| Antioxidant E | 0.2 | 150 | <2 |
| Antioxidant F | 0.2 | 150 | <2 |
| $TiO_2$ plus 2-hydroxy-4-octyloxybenzophenone | 2 / 0.2 | 200 | ca. 4 |
| $TiO_2$ plus Antioxidant A | 2 / 0.2 | 850 | >8 |
| $TiO_2$ plus Antioxidant B | 2 / 0.2 | 850 | >8 |
| $TiO_2$ plus Antioxidant C | 2 / 0.2 | 850 | >8 |
| $TiO_2$ plus Antioxidant D | 2 / 0.2 | 800 | 2 |
| $TiO_2$ plus Antioxidant E | 2 / 0.2 | 850 | 4 |
| $TiO_2$ plus Antioxidant F | 2 / 0.2 | 250 | >8 |
| $TiO_2$ plus Antioxidant B plus 2-hydroxy-4-octyloxybenzophenone | 2 / 0.2 / 0.2 | 500 | ca. 4 |
| $TiO_2$ plus Antioxidant B plus 2-hydroxy-4-octyloxybenzophenone | 2 / 0.1 / 0.1 | 500 | ca. 4 |

EXAMPLE 2

To show that the superior effect of a combination of $TiO_2$ and an antioxidant occurs in polypropylene but is not found in other well-known polymeric plastic compositions, samples of acrylonitrile-butadiene-styrene (ABS) and polyvinylchloride were subjected to the following tests.

The additives were combined with the polymer using procedures adapted to the particular polymer. In the case of the ABS polymer, the number of hours of exposure in a fluorescent sunlamp-blacklight lamp (FS–BL) before brittle point was determined. The degree of deterioration in polyvinylchloride was measured by development of yellow color (change in yellow index) which is an appropriate test for this polymer.

The results are shown in the following tables in which the letters have the same significance as in Example 1.

TABLE II.—ABS POLYMER

| No. | Antioxidant | Percent Weight Conc. | Hours Exposure to FS–BL to Brittle Point |
|---|---|---|---|
| 1 | With no $TiO_2$ and no antioxidant. | | 16 |
| 2 | $TiO_2$ only | 2 | 16 |
| 3 | Antioxidant A | 0.5 | 24 |
| 4 | Antioxidant A / $TiO_2$ | 0.5 / 2.0 | 24 |
| 5 | Antioxidant B / $TiO_2$ | 0.5 / 2.0 | 24 |
| 6 | Antioxidant C / $TiO_2$ | 0.5 / 2.0 | 24 |
| 7 | Antioxidant D / $TiO_2$ | 0.5 / 2.0 | 24 |

TABLE III.—RIGID POLYVINYLCHLORIDE

| No. | Antioxidant | Percent Conc. (wt.) | Initial Yellow Index (Y.I.) | Hours Exposure to FS–BL for Yellow ΔY.I. of 15 |
|---|---|---|---|---|
| 1 | Control (None) | | 6 | 350 |
| 2 | Antioxidant A / $TiO_2$ | 0.2 / 2.0 | 6 | 190 |
| 3 | Antioxidant B / $TiO_2$ | 0.2 / 2.0 | 6 | 170 |

We claim:

1. Polypropylene stabilized by the incorporation therein of 0.5 to 5.0 percent of $TiO_2$ and 0.02 to 1.0 percent of a compound selected from the group consisting of 2,6-di-tert-butyl-4-methylphenol, 2,6-bis(2-hydroxy-3-t-butyl-5-methylbenzyl) - p-cresol, 2,2'-methylenebis(4-ethyl-6-tert-butylphenol), 2,2' - methylenebis(4 - methyl - 6-tert-butylphenol) and 4,4' - butylidenebis(6-tert-butyl-m-cresol); said percentages being based upon the weight of the polypropylene.

2. The composition of claim 1 wherein the compound is 2,2'-methylenebis(4-methyl-6-tert-butylphenol).

3. The composition of claim 1 wherein the compound is 2,6-di-tert-butyl-4-methylphenol.

4. The composition of claim 1 wherein the compound is 4,4'-butylidenebis(6-tert-butyl-m-cresol).

No references cited.

MORRIS LIEBMAN, *Primary Examiner.*

J. S. WALDRON, S. L. FOX, *Assistant Examiners.*